US012668054B2

(12) United States Patent
Park et al.

(10) Patent No.: US 12,668,054 B2
(45) Date of Patent: Jun. 30, 2026

(54) SUBSTRATE PROCESSING METHOD AND SUBSTRATE PROCESSING SYSTEM USING THE SAME

(71) Applicant: SEMES CO., LTD., Chungcheongnam-do (KR)

(72) Inventors: Solmin Park, Cheonan-si (KR); Hyunmin Lee, Anyang-si (KR); Junho Kim, Cheonan-si (KR); Sujin Kim, Cheonan-si (KR)

(73) Assignee: SEMES CO., LTD., Chungcheongnam-Do (KR)

(*) Notice: Subject to any disclaimer, the term of this patent is extended or adjusted under 35 U.S.C. 154(b) by 154 days.

(21) Appl. No.: 18/411,107

(22) Filed: Jan. 12, 2024

(65) Prior Publication Data

US 2024/0239099 A1 Jul. 18, 2024

(30) Foreign Application Priority Data

Jan. 16, 2023 (KR) ........................ 10-2023-0006322

(51) Int. Cl.
*B41J 2/045* (2006.01)

(52) U.S. Cl.
CPC ......... *B41J 2/0451* (2013.01); *B41J 2/04558* (2013.01); *B41J 2/0457* (2013.01); *B41J 2/04581* (2013.01); *B41J 2/04588* (2013.01)

(58) Field of Classification Search
CPC ................................................ B41J 2029/3935
See application file for complete search history.

(56) References Cited

U.S. PATENT DOCUMENTS

2006/0132527 A1* 6/2006 Cordery ................. B41J 29/393 347/19
2011/0074854 A1* 3/2011 Saettel ................... B41J 29/393 347/16
2018/0001626 A1* 1/2018 Franzoso ................. B41J 2/135
2018/0222180 A1* 8/2018 Kumazawa .......... B41J 2/04556
2019/0054739 A1* 2/2019 Yasuda ................ B41J 2/04586

FOREIGN PATENT DOCUMENTS

JP 2007-203549 A 8/2007
JP 2016-168733 A 9/2016
JP 2020-196138 A 12/2020
KR 10-2018-0092275 A 8/2018

* cited by examiner

*Primary Examiner* — Shelby L Fidler
(74) *Attorney, Agent, or Firm* — Carter, DeLuca & Farrell LLP

(57) ABSTRACT

A substrate processing method includes determining a first impact of an ink droplet ejected toward a substrate moving at a first speed, determining a second impact of an ink droplet ejected toward the substrate moving at a second speed, determining a reference ejection speed based on the first impact and the second impact, determining a plurality of third impacts of a plurality of ink droplets respectively ejected from a plurality of nozzles toward the substrate moving at a third speed, determining an ink ejection speed of each of the plurality of nozzles based on the first impact and the plurality of third impacts, and comparing the ink ejection speeds of the plurality of nozzles with the reference ejection speed and determining whether ink ejection performance of the plurality of nozzles is abnormal.

11 Claims, 8 Drawing Sheets

SUBSTRATE PROCESSING METHOD AND SUBSTRATE PROCESSING SYSTEM USING THE SAME

CROSS-REFERENCE TO RELATED APPLICATION

This application is based on and claims priority under 35 U.S.C. § 119 to Korean Patent Application No. 10-2023-0006322, filed on Jan. 16, 2023, in the Korean Intellectual Property Office, the disclosure of which is incorporated by reference herein in its entirety.

BACKGROUND

1. Field

The disclosure relates to a substrate processing method and a substrate processing system using the substrate processing method. Specifically, the disclosure relates to a substrate processing method for inspecting a substrate printing device and a substrate processing system using the substrate processing method.

2. Description of the Related Art

As inkjet technologies develop, a range of applications thereof has expanded from office use to manufacturing of electronic components and displays using ejection of electronic materials or the like. As the range of applications of inkjet in a manufacturing process expands, technologies for controlling ink droplets in waveforms through precise control and speed measurement are required.

SUMMARY

The object of the disclosure is not limited to the above, and other objects and advantages of the disclosure that are not mentioned may be understood by the following description.

Additional aspects will be set forth in part in the description which follows and, in part, will be apparent from the description, or may be learned by practice of the presented embodiments of the disclosure.

Provided is a substrate processing method. According to an aspect of the disclosure, a substrate processing method includes determining a first impact of an ink droplet ejected toward a substrate moving at a first speed, determining a second impact of an ink droplet ejected toward the substrate moving at a second speed, determining a reference ejection speed based on the first impact and the second impact, determining a plurality of third impacts of a plurality of ink droplets respectively ejected from a plurality of nozzles toward the substrate moving at a third speed, determining an ink ejection speed of each of the plurality of nozzles based on the first impact and the plurality of third impacts, and comparing the ink ejection speeds of the plurality of nozzles with the reference ejection speed and determining whether ink ejection performance of the plurality of nozzles is abnormal.

Provided is a substrate processing method. According to another aspect of the disclosure, a substrate processing method includes ejecting a plurality of ink droplets by respectively applying voltages to piezoelectric elements of a plurality of nozzles, determining an ink ejection speed of each of the plurality of nozzles based on impacts of the plurality of ink droplets, determining whether ink ejection performance of the plurality of nozzles is abnormal based on shapes of the impacts and the ink ejection speeds of the plurality of ink droplets, and correcting the ink ejection performance based on abnormalities in the ink ejection performance of the plurality of nozzles.

Provided is a substrate processing system. According to another aspect of the disclosure, a substrate processing system includes a nozzle head unit including a plurality of nozzles that eject ink droplets on a substrate using an inkjet method and an inspection device determining an ink ejection speed of each of the plurality of nozzles based on impacts of ink droplets ejected from the nozzle head unit to the substrate, the inspection device comparing the ink ejection speeds with a reference ejection speed and determining whether ink ejection performance is abnormal, wherein the inspection device simultaneously inspects the impacts of the ink droplets ejected from the plurality of nozzles.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
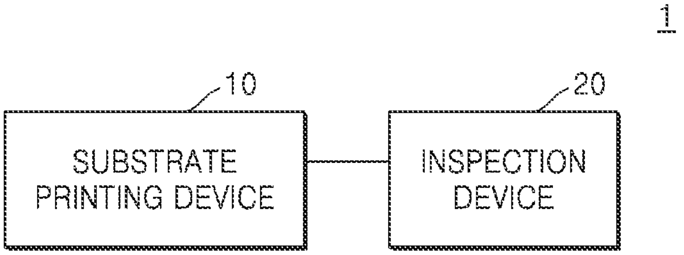
FIG. 1 is a diagram schematically showing an inner configuration of a substrate processing system employing a substrate processing method, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described in detail with reference to the accompanying drawings so that those skilled in the art can easily practice the disclosure. The disclosure may be embodied in many different forms but not limited to embodiments described herein.

FIG. 1 is a diagram schematically showing an inner configuration of a substrate processing system 1 according to an embodiment.

Referring to FIG. 1, the substrate processing system 1 may include a substrate printing device 10 and an inspection device 20.

The substrate printing device 10 prints a substrate used in a display device. This substrate printing device 10 may be configured as printing equipment that ejects ink or the like on a substrate using, for example, an inkjet system.

Figure 2:
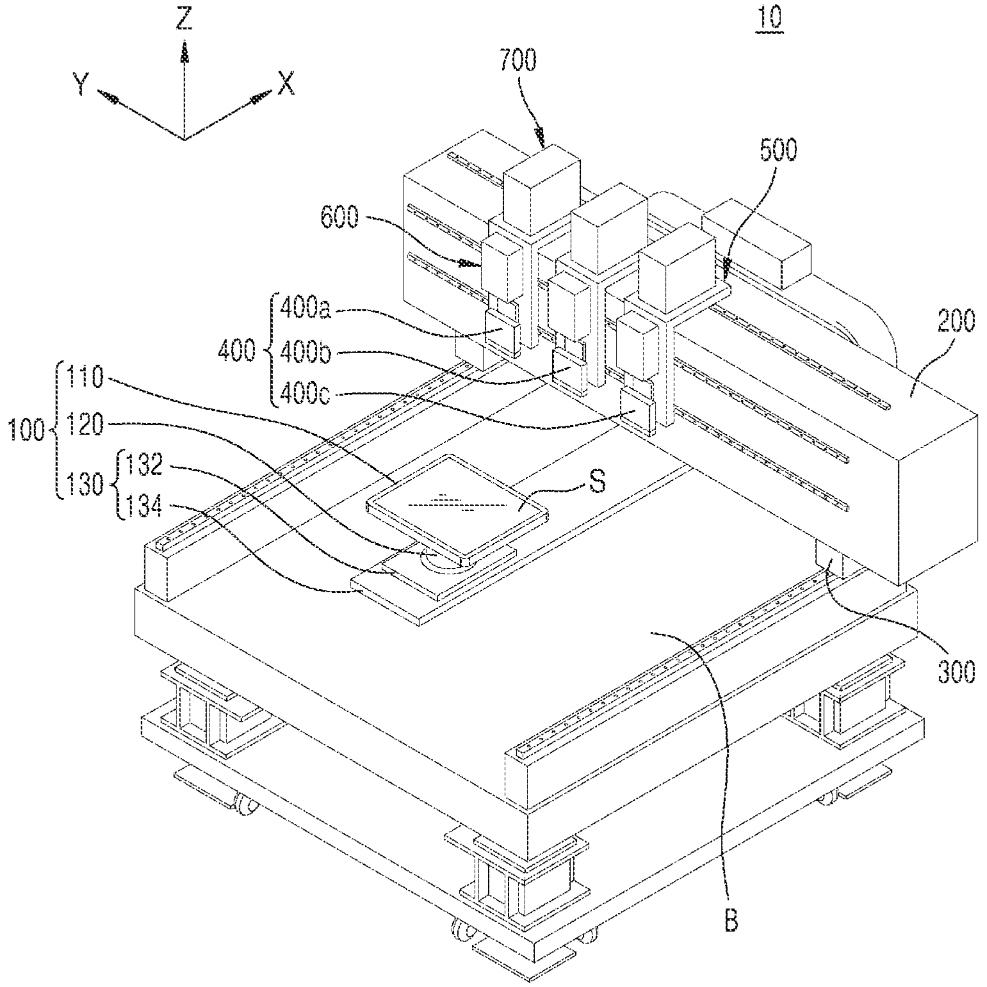
FIG. 2 is a perspective view schematically showing an inner structure of a substrate printing device in the substrate processing system employing the substrate processing method, according to an embodiment.

FIG. 2 is a perspective view schematically showing an inner structure of the substrate printing device 10 in the substrate processing system 1 according to an embodiment.

Referring to FIG. 2, the substrate printing device 10 may include a base B, a substrate support unit 100, a gantry 200, a gantry moving unit 300, a nozzle head unit 400, a head moving unit 500, an ink supply unit 600, and a control unit 700.

The base B may be provided in a rectangular parallelepiped shape having a constant thickness. The substrate support unit 100 is disposed on the upper surface of the base B. The substrate support unit 100 has a support plate 110 on which a substrate S is placed. The support plate 110 may have a quadrangular shape. A rotation driving member 120 is connected to the lower surface of the support plate 110. The rotation driving member 120 may include a rotary motor. The rotation driving member 120 rotates the support plate 110 about a rotation center axis perpendicular to the support plate 110.

When the support plate 110 is rotated by the rotation driving member 120, the substrate S may be rotated by the rotation of the support plate 110. When the long side of a cell formed on a substrate on which ink is to be applied is oriented in a second direction (Y direction), the rotation driving member 120 may rotate the substrate so that the long side of the cell is oriented in a first direction (X direction).

The support plate 110 and the rotation driving member 120 may be moved in a straight line in the first direction (X direction) by a linear driving member 130. The linear driving member 130 includes a slider 132 and a guide member 134. The rotation driving member 120 is installed on the upper surface of the slider 132. The guide member 134 extends lengthwise in the first direction (X direction) from the center on the upper surface of the base B. A linear motor (not shown) may be built in the slider 132, and the slider 132 is moved in a straight line in the first direction (X direction) along the guide member 134 by the linear motor.

The gantry 200 is provided above the path along which the support plate 110 moves. The gantry 200 is spaced apart from the upper surface of the base B in an upward direction and arranged such that the longitudinal direction of the gantry 200 is oriented in the second direction (Y direction). The nozzle head unit 400 is coupled to the gantry 200 by the head moving unit 500. The nozzle head unit 400 may move in a straight line in the longitudinal direction of the gantry 200, that is, in the second direction (Y direction) and may also move in a straight line in a third direction (Z direction) by the head moving unit 500.

The gantry moving unit 300 may move the gantry 200 in a straight line in the first direction (X direction) or rotate the gantry 200 such that the longitudinal direction of the gantry 200 is oriented in a direction inclined to the first direction (X direction). Due to the rotation of the gantry 200, nozzles (not shown) of the nozzle head unit 400 are aligned with each other in a direction inclined to the first direction (X direction).

With one end of the gantry 200 as the center of rotation, the gantry moving unit 300 may rotate another end of the gantry 200. Alternatively, the gantry moving unit 300 may be configured to rotate the gantry 200 with the center of the gantry 200 as the center of rotation.

The gantry moving unit 300 includes a first driving unit and a second driving unit. The first driving unit is provided at one end of the gantry 200, which is the center of rotation, and the second driving unit is provided at another end of the gantry 200.

The nozzle head unit 400 ejects ink droplets onto a substrate. A plurality of nozzle head units 400 may be provided. The embodiment shown in FIG. 2 is provided with three nozzle head units 400*a*, 400*b*, and 400*c*, but the embodiment is not limited thereto. The nozzle head units 400 may be arranged side by side in the second direction (Y direction) and coupled to the gantry 200.

The nozzle head unit 400 may include a number of piezoelectric elements corresponding to the number of nozzles. Here, ejection amounts of ink and/or ejection speeds of ink droplets from the nozzles may be independently adjusted by controlling voltages applied to the piezoelectric elements.

A plurality of nozzles (not shown) for ejecting ink droplets are provided on the bottom surface of the nozzle head unit 400. For example, each of the nozzle head units 400 may include 128 or 256 nozzles. The nozzles may be arranged in a line at constant pitch intervals. In some embodiments, the plurality of nozzles may respectively include the piezoelectric elements.

Head moving units 500 may be respectively provided in the nozzle head units 400. In the embodiment, since the three nozzle head units 400*a*, 400*b*, and 400*c* are provided, three head moving units 500 may be provided so as to correspond to the number of nozzle head units 400*a*, 400*b*, and 400*c*.

Alternatively, one head moving unit 500 may be provided, and in this case, the nozzle head units 400 may be moved as a single body rather than individually. The head moving unit 500 may move the nozzle head unit 400 in a straight line in the longitudinal direction of the gantry 200, that is, in the second direction (Y direction) or may move the nozzle head unit 400 in the third direction (Z direction).

The ink supply unit 600 is installed in the head moving unit 500 and stores ink to be supplied to the nozzle head unit 400. The ink supply unit 600 supplies ink to the nozzle head unit 400 under the control of the control unit 700. The ink supply unit 600 maintains and stores a certain amount of ink to supply a certain amount of ink to the nozzle head unit 400.

The control unit 700 is installed in the head moving unit 500 and controls ink supply to the nozzle head unit 400, regulation of pressure, adjustment of ejection amounts, or the like. For example, a boundary of ink ejected onto the substrate S may be formed by adjusting the ejection amount of ink from some nozzles of the nozzle head units 400*a*, 400*b*, and 400*c*.

Figure 3:
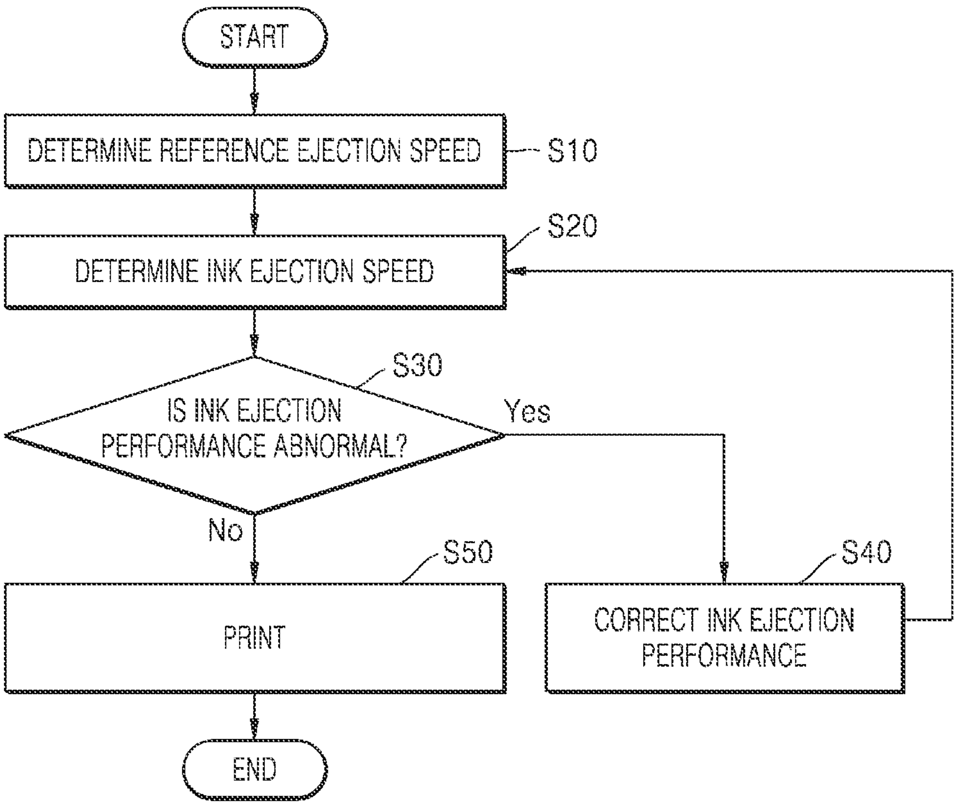
FIG. 3 is a flowchart sequentially showing a substrate processing method according to an embodiment.
Figure 4:
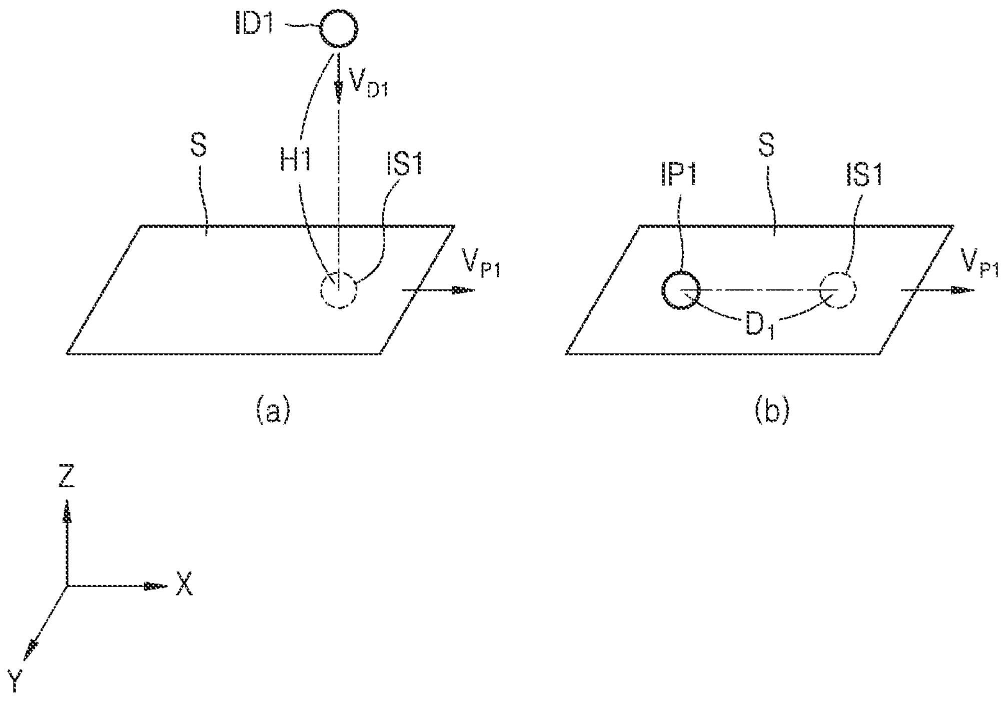
FIGS. 4 to 6 are diagrams for explaining a method of determining a reference ejection speed in the substrate processing method, according to an embodiment.
Figure 5:
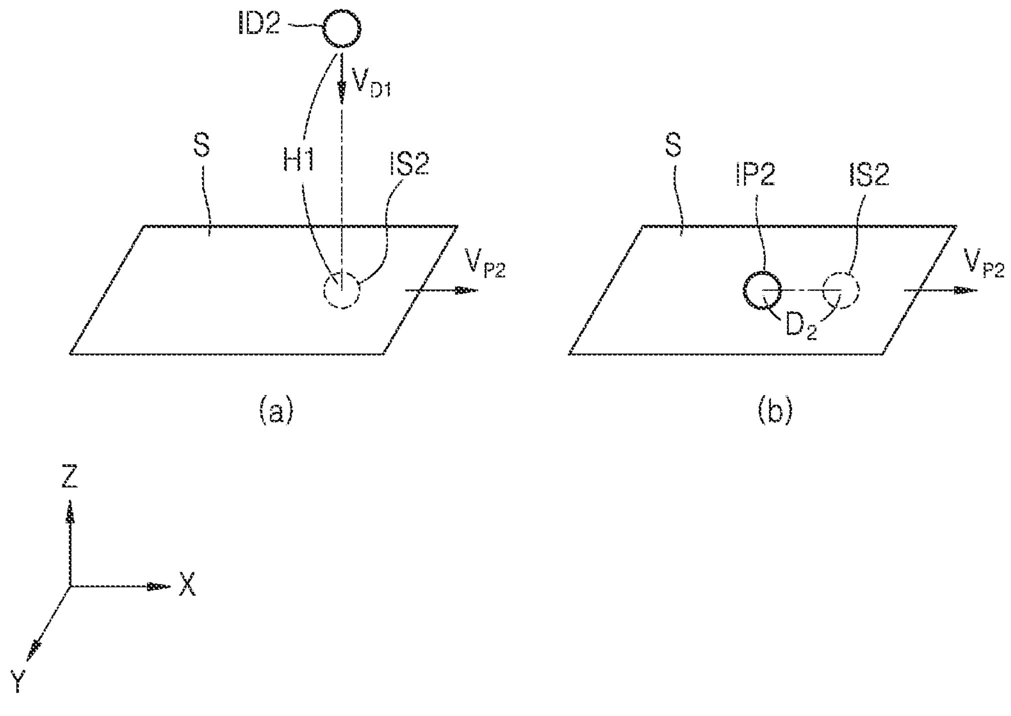
Figure 6:
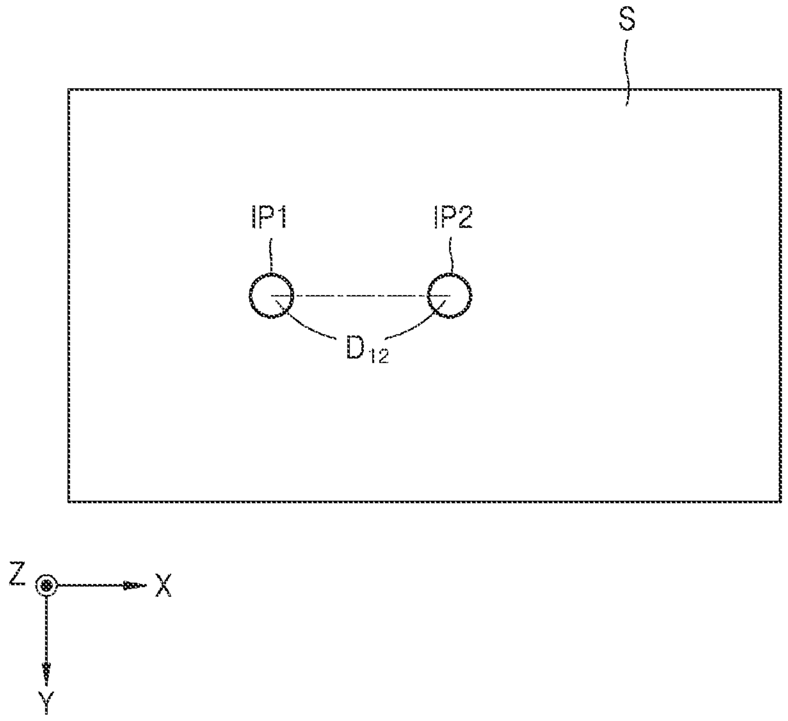

FIG. 3 is a flowchart sequentially showing the substrate processing method according to an embodiment. Specifically, FIG. 3 sequentially shows the substrate processing method performed by the substrate processing system 1 of FIG. 1. FIGS. 4 to 6 are diagrams for explaining a process through which the inspection device 20 of FIG. 1 determines a reference ejection speed SV according to the substrate processing method according to an embodiment. Specifically, FIG. 4 is a diagram for explaining an operation of determining a first impact IP1 of a first ink droplet ID1 ejected toward a substrate S moving at a first speed $VP_1$. Specifically, FIG. 5 is a diagram for explaining an operation of determining a second impact IP2 of a second ink droplet ID2 ejected toward the substrate S moving at a second speed $VP_2$.

Referring to FIG. 3, an operation (S10) may be performed to determine the reference ejection speed SV. Specifically, the operation (S10) for determining the reference ejection speed SV may be performed through processes as described below with reference to FIGS. 4 to 6.

Referring to FIGS. 3 and 4 together, the first impact IP1 may be generated by the first ink droplet ID1 that is ejected from a first nozzle (not shown) at a first ejection speed $V_{D1}$ toward the substrate S moving at the first speed $V_{P1}$ in a first direction (X direction).

Specifically, referring to (a) of FIG. 4, the first ink droplet ID1 ejected at a first height H1 with respect to the substrate S may have a first ink shadow IS1 which is directly below the first ink droplet ID1 in a vertical direction, that is, below the first ink droplet ID1 in a third direction (Z direction). The first ink shadow IS1 may represent the location of impact that would be generated by the first ink droplet ID1 if the substrate S does not move.

Next, referring to (b) of FIG. 4, as the substrate S moves at the first speed $V_{P1}$ in the first direction (X direction), the first impact IP1 may be generated at a location distant from the first ink shadow IS1 by a first distance $D_1$. The first distance $D_1$, which is the distance between the first ink shadow IS1 and the first impact IP1, may be the product of the first speed $V_{P1}$ and the time taken for the first ink droplet ID1 ejected at the first ejection speed $V_{D1}$ to move the first height H1. That is, the first distance $D_1$ may be expressed by Equation (1) below.

$$\text{First distance } (D_1) = \text{First speed } (V_{P1}) \times \frac{\text{First height } (H1)}{\text{First ejection speed } (V_{D1})} \tag{1}$$

Referring to FIGS. 3 and 5 together, the second impact IP2 may be generated by the second ink droplet ID2 that is ejected from the first nozzle (not shown) at the first ejection speed $V_{D1}$ toward the substrate S moving at the second speed $V_{P2}$ in the first direction (X direction). In some embodiments, the ejection speed of the second ink droplet ID2, that is, a first ejection speed $V_{D1}$, may be set to be the same as when the first ink droplet ID1 is ejected. In some embodiments, the height at which the second ink droplet ID2 is ejected, that is, a first height H1, may be set to be the same as when the first ink droplet ID1 is ejected. That is, the first ink droplet ID1 and the second ink droplet ID2 may be ejected in the same environment except for the speed at which the substrate S moves.

Specifically, referring to (a) of FIG. 5, the second ink droplet ID2 ejected at a first height H1 with respect to the substrate S may have a second ink shadow IS2 which is directly below the second ink droplet ID2 in the vertical direction, that is, below the second ink droplet ID2 in the third direction (Z direction). The second ink shadow IS2 may represent the location of impact that would be generated by the second ink droplet ID2 if the substrate S does not move.

Next, referring to (b) of FIG. 5, as the substrate S moves at the second speed $V_{P2}$ in the first direction (X direction), the second impact IP2 may be generated at a location distant from the second ink shadow IS2 by a second distance $D_2$. The second distance $D_2$, which is the distance between the second ink shadow IS2 and the second impact IP2, may be the product of the second speed $V_{P2}$ and the time taken for the second ink droplet ID2 ejected at the first ejection speed $V_{D1}$ to move the first height H1. That is, the second distance $D_2$ may be expressed by Equation (2) below.

$$\text{Second distance } (D_2) = \text{Second speed } (V_{P2}) \times \frac{\text{First height } (H1)}{\text{First ejection speed } (V_{D1})} \tag{2}$$

The embodiment in FIGS. 4 and 5 shows an example in which the second speed $V_{P2}$ is less than the first speed $V_{P1}$, and thus, the second distance $D_2$ is less than the first distance $D_1$. However, the technical idea of the disclosure is not limited thereto.

Referring to FIGS. 3 and 6 together, the first ejection speed $V_{D1}$ may be determined using the first impact IP1 and the second impact IP2, which are generated on the substrate S. FIG. 6 illustrates a case in which both the first impact IP1 and the second impact IP2 are generated on a single substrate S. However, the embodiment is not limited thereto, and the first impact IP1 and the second impact IP2 may be generated on different substrates S.

Specifically, when the first ejection speed $V_{D1}$ is determined using the fact that a distance D12 between the first impact IP1 and the second impact IP2 is equal to the difference between the first distance $D_1$ and the second distance $D_2$, the first ejection speed $V_{D1}$ may be expressed by Equation (3) below. In some embodiments, when the first impact IP1 and the second impact IP2 are generated on different substrates S, the distance D12 between the first impact IP1 and the second impact IP2 may be measured using the coordinates of positions of the first impact IP1 and the second impact IP2.

$$\text{First ejection speed } (V_{D1}) = (\text{First speed } (V_{P1}) - \text{Second speed } (V_{P2})) \times \frac{\text{First height } (H1)}{\text{Distance } (D_{12}) \text{ between first impact } (IP1) \text{ and second impact } (IP2)} \tag{3}$$

The first ejection speed $V_{D1}$ determined through the above process may be set as the reference ejection speed SV and compared with an ink ejection speed determined through a process described below.

Figure 7:
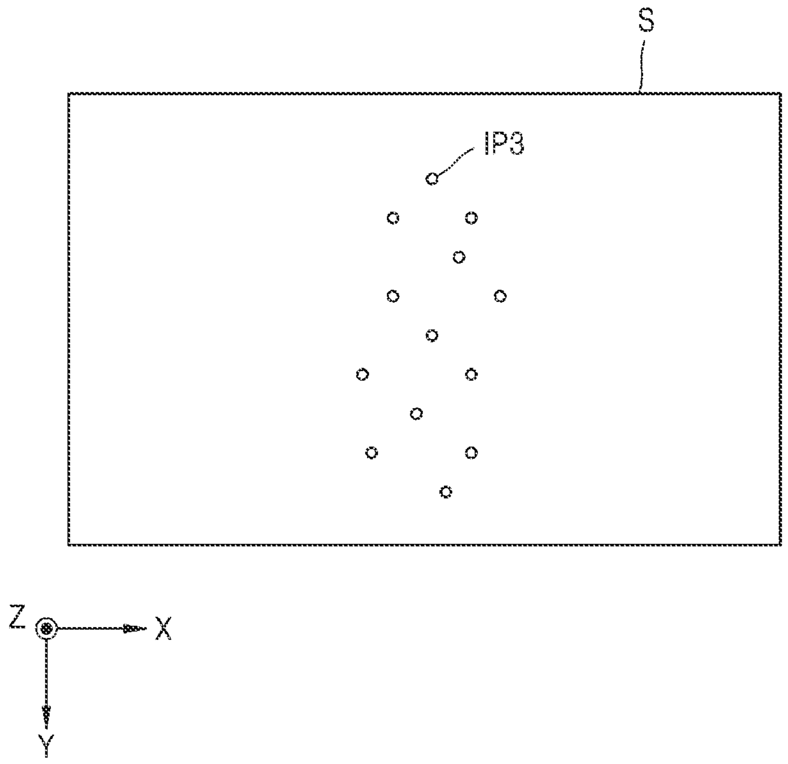
FIG. 7 is a diagram for explaining a method of determining an ink ejection speed in the substrate processing method, according to an embodiment.

FIG. 7 is a diagram for explaining a process through which the inspection device 20 of FIG. 1 determines an ink ejection speed according to the substrate processing method according to an embodiment. Specifically, this diagram shows a third impact IP3 of a third ink droplet ejected toward the substrate S moving at a third speed $V_{P3}$.

Referring to FIGS. 3 and 7 together, an operation (S20) of determining an ink ejection speed $V_{D2}$ may be performed.

Specifically, it is possible to determine a plurality of third impacts IP3 of third ink droplets, which are respectively ejected from a plurality of nozzles (not shown) toward the substrate S moving at the third speed $V_{P3}$ in the first direction (X direction). In some embodiments, the third impacts IP3 of the plurality of third ink droplets may be generated at different locations on the substrate S. For example, the third impacts IP3 of the plurality of third ink droplets ejected from one nozzle may be generated differently from each other in the first direction (X direction) on the substrate S. For example, the third impacts IP3 of the plurality of third ink droplets ejected from the plurality of nozzles may be generated differently from each other in the second direction (Y direction) on the substrate S. That is, the positions of the third impacts IP3 of the plurality of third ink droplets may have a deviation on the substrate S.

Next, ink ejection speeds $V_{D2}$ of the plurality of nozzles may be determined using the first impact IP1 (see FIG. 4) and the plurality of third impacts IP3. In some embodiments, the ink ejection speeds $V_{D2}$ of the plurality of nozzles may be different from each other. Specifically, the ink ejection speeds $V_{D2}$ of the plurality of nozzles may have a deviation.

In some embodiments, the process of determining the ink ejection speed $V_{D2}$ of each of the plurality of nozzles using the first impact IP1 and the plurality of third impacts IP3 may be similar to the process of determining the reference ejection speed SV using the first impact IP1 and the second impact IP2 (see FIG. 5) described above. Specifically, the distance between the first impact IP1 and each of the plurality of third impacts IP3 may be measured by comparing the coordinates for the position of the first impact IP1 on the substrate S with the coordinates for each of the positions of the plurality of third impacts IP3 in FIG. 7. The distance between the first impact IP1 and each of the plurality of third impacts IP3 may be expressed by Equation (4) below. In some embodiments, the height at which a third ink droplet ID3 is ejected may be set to the first height H1, which is the same as when the first ink droplet ID1 is ejected. Also, the distance between the first impact IP1 and each of the plurality of third impacts IP3 may represent a separation distance in the first direction (X direction).

Ink ejection speed $$(V_{D2}) = (\text{First speed } (V_{P1}) - \text{Third speed } (V_{P3})) \times \frac{\text{First height}(H1)}{\text{Distance between first impact } (IP1) \text{ and third impact } (IP3)} \quad (4)$$

Next, continuing to refer to FIG. 3, an operation (S30) of determining whether ink ejection performance is abnormal may be performed. The abnormality of ink ejection performance is described below with reference to FIGS. 8A to 8D.

FIGS. 8A TO 8D are diagrams illustrating cases in which there are abnormalities in ink ejection performance when the inspection device 20 of FIG. 1 determines the ink ejection speeds $V_{D2}$ according to the substrate processing method according to an embodiment. Specifically, FIGS. 8A TO 8D shows the ink ejection speed $V_{D2}$ of each of the plurality of nozzles on the basis of the reference ejection speed SV. In FIGS. 8A TO 8D, on the basis of the reference ejection speed SV indicated by the solid line, it is possible to determine whether there is an abnormality in ink ejection performance by checking whether the ink ejection speeds $V_{D2}$ are within an error range indicated by the dashed lines. For example, it is possible to determine whether there is an abnormality in ink ejection performance, using the median value and standard deviation of the ink ejection speeds $V_{D2}$ of the plurality of nozzles, the shapes of the plurality of third impacts IP3, or the like.

Figure 8A:
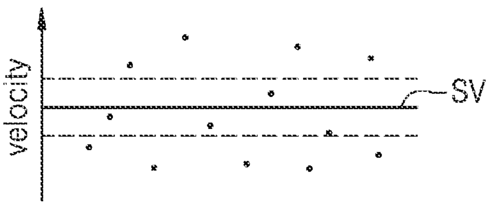
FIGS. 8A to 8D are diagrams illustrating examples of cases in which there are abnormalities in ink ejection performance when the ink ejection speed is determined in the substrate processing method according to an embodiment.

For example, referring to FIG. 8A, the ink ejection speeds $V_{D2}$ of the plurality of nozzles have a standard deviation greater than an allowable error range. In this case, it may be determined that the speed of the ink droplet ejected from each of the plurality of nozzles is low, and thus, the straightness is insufficient.

Figure 8B:
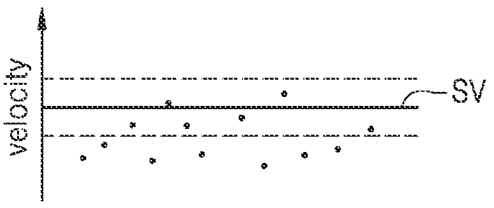

For example, referring to FIG. 8B, the ink ejection speeds $V_{D2}$ of the plurality of nozzles have speeds lower than the allowable error range. In other words, the ink ejection speeds $V_{D2}$ of the plurality of nozzles have a median value that is less than the reference ejection speed SV.

Figure 8C:
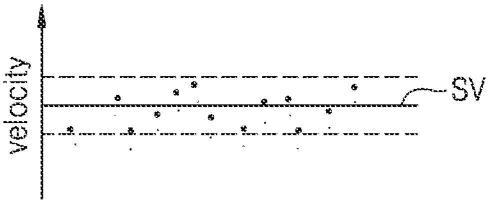

For example, referring to FIG. 8C, the ink droplets ejected from of the plurality of nozzles are divided into large ink droplets and small ink droplets. This may be determined that the ejection speeds of ink droplets become excessive due to excessive voltages.

Figure 8D:
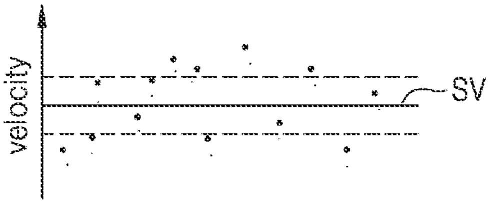

For example, referring to FIG. 8D, the ink ejection speeds $V_{D2}$ of the plurality of nozzles have a standard deviation greater than the allowable error range. In addition, the ink droplets ejected from the plurality of nozzles are divided into large ink droplets and small ink droplets.

Next, continuing to refer to FIG. 3, when it is determined that there is an abnormality in ink ejection performance during the operation (S30) of determining whether there is an abnormality in ink ejection performance, an operation (S40) of correcting the ink ejection performance may be performed.

For example, in the case of FIG. 8A, the ejection speeds of ink droplet are increased by increasing the voltages applied to the piezoelectric elements of the plurality of nozzles. Accordingly, the ink ejection performance may be corrected.

For example, in the case of FIG. 8B, the ejection speeds of ink droplet are increased by increasing the voltages applied to the piezoelectric elements of the plurality of nozzles. Accordingly, the ink ejection performance may be corrected.

For example, in the case of FIG. 8C, the ejection speeds of ink droplet are reduced by reducing the voltages applied to the piezoelectric elements of the plurality of nozzles. Accordingly, the ink ejection performance may be corrected.

For example, in the case of FIG. 8D, the ejection speeds of ink droplets are increased by increasing the voltages applied to the piezoelectric elements of the plurality of nozzles, and the waveforms of the voltage pulses applied to the piezoelectric elements are changed. Accordingly, the Ink ejection performance may be corrected.

Referring back to FIG. 3, printing may be performed (S50), when it is determined that there is no abnormality in ink ejection performance during the operation (S30) of determining whether there is an abnormality in ink ejection performance or when it is determined that there is no abnormality in ink ejection performance during the operation (S30) of determining whether there is an abnormality in ink ejection performance after the operation (S40) of correcting the ink ejection performance and the operation (S20) of determining the ink ejection speeds.

According to embodiments, the substrate processing method is provided, in which the ink ejection speeds of the plurality of nozzles are determined by determining the impacts of the plurality of ink droplets ejected from the plurality of nozzles, and it is determined whether there is an abnormality in the ink ejection performance of the plurality of nozzles by comparing the ink ejection speeds with the reference ejection speed. In particular, in the substrate processing method according to the embodiments, unlike a process in which a drop watcher, which is a measuring instrument according to the related art, measures the shapes of ink droplets, the ink ejection speeds of the nozzles may be determined using the impacts of the ink droplets generated on the substrate, and thus, it is possible to determine whether the ink ejection performance of the nozzles is abnormal without limiting the height at which the ink droplets are ejected. In particular, in the substrate processing method according to the embodiments, even when the plurality of nozzles eject ink droplets simultaneously, it is possible to determine whether there is an abnormality in the ink ejection performance of the plurality of nozzles using the impacts of ink droplets generated on the substrate. In particular, in the substrate processing method according to the embodiments, the equation (i.e., Equation (4)) that calculates the ink ejection speeds is determined in advance using common and previously known values (e.g., the moving speeds of the substrate and the height of the nozzles), and the newly measured values (i.e., the distance between the first impact IP1 and the third impact IP3) are input into the above equation. Accordingly, the ink ejection speeds of the plurality of nozzles may be determined simultaneously or very quickly. In other words, the embodiments may provide the substrate processing method having improved ability to determine ink ejection performance and the substrate processing system using the same.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A substrate processing method comprising:

determining a first impact of an ink droplet ejected toward a substrate moving at a first speed;

determining a second impact of an ink droplet ejected toward the substrate moving at a second speed;

determining a reference ejection speed based on the first impact and the second impact;

determining a plurality of third impacts of a plurality of ink droplets respectively ejected from a plurality of nozzles toward the substrate moving at a third speed;

determining an ink ejection speed of each of the plurality of nozzles based on the first impact and the plurality of third impacts; and comparing the ink ejection speeds of the plurality of nozzles with the reference ejection speed and determining whether ink ejection performance of the plurality of nozzles is abnormal.

2. The substrate processing method of claim 1, wherein the plurality of ink droplets respectively ejected from the plurality of nozzles are ejected simultaneously.

3. The substrate processing method of claim 1, wherein, during the determining of the ink ejection speed of each of the plurality of nozzles, the ink ejection speeds of the plurality of nozzles are simultaneously determined.

4. The substrate processing method of claim 1, wherein the first impact and the second impact are generated by ink droplets ejected from a first nozzle toward the substrate, and during the determining of the reference ejection speed using the first impact and the second impact, the first speed, the second speed, a distance from the first nozzle to the substrate, and a distance between the first impact and the second impact are used.

5. The substrate processing method of claim 4, wherein, during the determining of the reference ejection speed, Equation (1) below is used $$\text{Reference ejection speed} = (\text{First speed} - \text{Second speed}) \times \frac{\text{Distance from first nozzle to substrate}}{\text{Distance between first impact and second impact}}. \tag{1}$$

6. The substrate processing method of claim 1, wherein the substrate moves in a first direction parallel to an upper surface of the substrate, and the ink droplets are ejected in a second direction perpendicular to the upper surface of the substrate.

7. The substrate processing method of claim 1, wherein, during the determining of whether the ink ejection performance of the plurality of nozzles is abnormal, at least one of a median value and a standard deviation of the ink ejection speeds of the plurality of nozzles is used.

8. The substrate processing method of claim 1, further comprising, after the determining of whether the ink ejection performance of the plurality of nozzles is abnormal, correcting the ink ejection performance based on abnormalities in the ink ejection performance.

9. A substrate processing system comprising:

a nozzle head unit comprising a plurality of nozzles that eject ink droplets on a substrate using an inkjet method; and an inspection device determining an ink ejection speed of each of the plurality of nozzles based on impacts of ink droplets ejected from the nozzle head unit to the substrate, wherein the inspection device;

determines a first impact of an ink droplet ejected toward a substrate moving at a first speed;

determines a second impact of an ink droplet ejected toward the substrate moving at a second speed;

determines a reference ejection speed based on the first impact and the second impact;

determines a plurality of third impacts of a plurality of ink droplets respectively ejected from a plurality of nozzles toward the substrate moving at a third speed;

determines an ink ejection speed of each of the plurality of nozzles based on the first impact and the plurality of third impacts; and compares the ink ejection speeds of the plurality of nozzles with the reference ejection speed and determining whether ink ejection performance of the plurality of nozzles is abnormal, wherein the inspection device, after the determining of whether the ink ejection performance of the plurality of nozzles is abnormal, the inspection device corrects the ink ejection performance by changing voltages applied to each of the plurality of nozzles.

10. The substrate processing system of claim 9, wherein the inspection device simultaneously inspects the impacts of the ink droplets simultaneously ejected from the plurality of nozzles.

11. The substrate processing system of claim 9, wherein, during the determining of the ink ejection speeds, Equation (2) below is used $$\text{Ink ejection speed} = (\text{First speed} - \text{Second speed}) \times \frac{\text{Distance from each of plurality of nozzles to substrate}}{\text{Distance between first impact and second impact}}. \tag{2}$$

* * * * *